US012113277B2

(12) United States Patent
Sleasman et al.

(10) Patent No.: US 12,113,277 B2
(45) Date of Patent: Oct. 8, 2024

(54) MULTIFUNCTIONAL METASURFACE ANTENNA

(71) Applicant: The Johns Hopkins University, Baltimore, MD (US)

(72) Inventors: Timothy A. Sleasman, Catonsville, MD (US); David B. Shrekenhamer, Bethesda, MD (US); Paul A. Vichot, Ellicott City, MD (US); Stephanie D. Lashley, Columbia, MD (US)

(73) Assignee: The Johns Hopkins University, Baltimore, MD (US)

(*) Notice: Subject to any disclaimer, the term of this patent is extended or adjusted under 35 U.S.C. 154(b) by 203 days.

(21) Appl. No.: 17/466,384

(22) Filed: Sep. 3, 2021

(65) Prior Publication Data

US 2022/0399651 A1 Dec. 15, 2022

Related U.S. Application Data

(60) Provisional application No. 63/210,617, filed on Jun. 15, 2021.

(51) Int. Cl.
*H01Q 15/00* (2006.01)
*H01Q 1/50* (2006.01)
(Continued)

(52) U.S. Cl.
CPC ........... *H01Q 15/0086* (2013.01); *H01Q 1/50* (2013.01); *H01Q 3/2658* (2013.01); *H01Q 19/067* (2013.01); *H01Q 21/0087* (2013.01)

(58) Field of Classification Search
CPC .... H01Q 15/0086; H01Q 1/50; H01Q 3/2658; H01Q 19/067; H01Q 21/0087
(Continued)

(56) References Cited

U.S. PATENT DOCUMENTS 9,263,788 B2 * 2/2016 Ayatollahi ............... H01Q 7/00
9,374,887 B1 * 6/2016 Warne .................... G02B 1/002
(Continued)

OTHER PUBLICATIONS

Li et al.("Metasurfaces and their applications", De Gruyter, Nanophotonics 2018; 7(6): 989-1011) (Year: 2018).*
(Continued)

*Primary Examiner* — Iftekhar A Khan
(74) *Attorney, Agent, or Firm* — Todd R. Farnsworth

(57) ABSTRACT

A method for constructing a multifunctional antenna structure configured to generate a plurality of radiation patterns includes determining a desired source field associated with the plurality of radiation patterns, and receiving feed locations for a waveguide to an antenna aperture surface. The method may further include placing a metasurface resonator at a first resonator location that exhibits a minimum error relative to the desired source field and satisfies a maximum error threshold relative to the desired source field. The metasurface resonator may be determined based on the feed locations and a plurality of degrees of freedom for the first resonator location. The method may also include discarding a second resonator location in response to determining that no metasurface resonator at the second resonator location satisfies the maximum error threshold. The plurality of degrees of freedom may include metasurface resonator geometries that exhibit different polarizabilities defined in a candidate library.

13 Claims, 10 Drawing Sheets

(51) Int. Cl.
*H01Q 3/26* (2006.01)
*H01Q 19/06* (2006.01)
*H01Q 21/00* (2006.01)

(58) Field of Classification Search
USPC ........................................................... 703/13
See application file for complete search history.

(56) References Cited

U.S. PATENT DOCUMENTS

| | | | | |
|---|---|---|---|---|
| 9,786,986 | B2 * | 10/2017 | Johnson | H01Q 3/26 |
| 10,090,597 | B1 * | 10/2018 | Nassar | H01Q 13/10 |
| 10,135,147 | B2 * | 11/2018 | Henry | H01Q 13/06 |
| 10,340,599 | B2 * | 7/2019 | Tayfeh Aligodarz | H01Q 9/0485 |
| 11,108,143 | B2 * | 8/2021 | Leung | H01Q 9/0485 |
| 11,281,957 | B2 * | 3/2022 | Mangal | H04W 4/80 |
| 11,487,183 | B1 * | 11/2022 | Akselrod | B05D 5/063 |
| 2008/0048917 | A1 * | 2/2008 | Achour | H01Q 9/0407 343/700 MS |
| 2010/0156573 | A1 * | 6/2010 | Smith | H01P 3/081 333/239 |
| 2011/0068990 | A1 * | 3/2011 | Grzyb | H01P 5/024 343/772 |
| 2011/0140543 | A1 * | 6/2011 | Ryu | H02J 50/12 307/104 |
| 2013/0021220 | A1 * | 1/2013 | Bair | H01Q 1/50 343/861 |
| 2014/0327597 | A1 * | 11/2014 | Rashidian | H01Q 1/50 343/905 |
| 2016/0020018 | A1 * | 1/2016 | Wang | H01Q 7/00 307/104 |
| 2016/0156090 | A1 * | 6/2016 | Campione | H01Q 15/006 333/219.1 |
| 2016/0156325 | A1 * | 6/2016 | Boutayeb | H01Q 13/00 343/722 |
| 2016/0294056 | A1 * | 10/2016 | Manteghi | H04L 27/12 |
| 2016/0322708 | A1 * | 11/2016 | Tayfeh Aligodarz | H01Q 21/0087 |
| 2017/0062943 | A1 * | 3/2017 | Patron | H01Q 15/0086 |
| 2017/0069967 | A1 * | 3/2017 | Shrekenhamer | H01Q 1/28 |
| 2017/0104265 | A1 * | 4/2017 | Hallivuori | H01Q 21/065 |
| 2018/0097286 | A1 * | 4/2018 | Black | H04L 27/00 |
| 2018/0306915 | A1 * | 10/2018 | Smith | H01Q 3/34 |
| 2019/0089055 | A1 * | 3/2019 | Arnitz | H01Q 21/061 |
| 2019/0252798 | A1 * | 8/2019 | Jain | H01Q 13/20 |
| 2019/0346545 | A1 * | 11/2019 | Sleasman | G01S 7/03 |
| 2019/0379126 | A1 * | 12/2019 | Leung | H01Q 9/0485 |
| 2020/0028270 | A1 * | 1/2020 | Faghih Imani | H01Q 3/44 |
| 2020/0044353 | A1 * | 2/2020 | Cohen | H01Q 21/061 |
| 2020/0083602 | A1 * | 3/2020 | Sethumadhavan | H01Q 21/205 |
| 2020/0153410 | A1 * | 5/2020 | Nielsen | H03H 11/12 |
| 2020/0241301 | A1 * | 7/2020 | Basset | G02B 5/1814 |
| 2020/0303828 | A1 * | 9/2020 | Urzhumov | H01Q 3/46 |
| 2020/0350672 | A1 * | 11/2020 | Chen | H01Q 5/10 |
| 2021/0132255 | A1 * | 5/2021 | Barton, III | G02B 1/002 |
| 2021/0210866 | A1 * | 7/2021 | Boyarsky | H01Q 13/28 |
| 2021/0218430 | A1 * | 7/2021 | Han | H04B 1/18 |
| 2022/0302584 | A1 * | 9/2022 | Zhang | H01Q 1/521 |
| 2022/0399651 | A1 * | 12/2022 | Sleasman | H01Q 21/0012 |

OTHER PUBLICATIONS

Pulido-Mancera et al. ("Polarizability extraction of complementary metamaterial elements in waveguides for aperture modeling", Physical Review B 96, 235402 (2017), pp. 1-14). (Year: 2017).*

Wang et al. ("Reconfigurable Multifunctional Metasurface for Broadband Polarization Conversion and Perfect Absorption", 2020, IEEE, pp. 105815-105823) (Year: 2020).*

Wu et al. ("Broadband Wide-Angle Multifunctional Polarization Converter via Liquid-Metal-Based Metasurface", Adv. Optical Mater. 2017, pp. 1-7) (Year: 2017).*

Xu et al. ("Compact Circularly Polarized Antennas Combining Meta-Surfaces and Strong Space-Filling Meta-Resonators", IEEE, 2013, EDA pp. 3442-3450) (Year: 2013).*

Gonzalez-Ovejero et al., Multibeam by metasurface antennas, IEEE Transactions on Antennas and Propagation, Jun. 2017, 8 pages, vol. 65, No. 6, p. 2923, IEEE.

Sleasman et al., Microwave imaging using a disordered cavity with a dynamically tunable impedance surface, Physical Review Applied, Nov. 2016, 10 pages, vol. 6, Iss. 5, p. 054019, American Physical Society.

Gollub et al., Large metasurface aperture for millimeter wave computational imaging at the human scale, Scientific Reports, Feb. 2017, 9 pages, 7, 42650; doi: 10.1038/srep42650. www.nature.com/scientificreports/.

Pulido-Mancera et al., Polarizability extraction of complementary metamaterial elements in waveguides for aperture modeling, Physical Review B, Dec. 2017, 14 pages, vol. 96, Iss. 23, p. 235402, American Physical Society.

Gowda et al., Focusing microwaves in the Fresnel zone with a cavity-backed holographic metasurface, IEEE Access, Feb. 2018, 10 pages, vol. 6, p. 12815, IEEE.

Maci et al., Metasurfing: Addressing waves on impenetrable metasurfaces, IEEE Antennas and Wireless Propagation Letters, Jan. 2012, 4 pages, vol. 10, p. 1499-1502, IEEE.

* cited by examiner

MULTIFUNCTIONAL METASURFACE ANTENNA

CROSS-REFERENCE TO RELATED APPLICATIONS

This application claims the benefit of U.S. Provisional Application No. 63/210,617 filed on Jun. 15, 2021, the entire contents of which are hereby incorporated herein by reference.

TECHNICAL FIELD

Example embodiments generally relate to radio frequency antennas and, in particular, relate to a metasurface antenna technologies.

BACKGROUND

Phased array antennas have been developed for use in a variety of applications and are leveraged because of their vast flexibility. However, phased array antennas are complicated to control and require substantial radio frequency overhead equipment to support the operation of the antenna. As a result, phased array antennas are relatively expensive, large, and consume substantial amounts of power to operate. As such, there is a need for further innovation in the space of controlled radiation pattern antennas to alleviate the drawbacks realized by conventional phased array antennas.

BRIEF SUMMARY OF SOME EXAMPLES

According to some example embodiments, a method for constructing a multifunctional antenna structure configured to generate a plurality of radiation patterns is provided. The example method may comprise determining, by processing circuitry, a desired source field associated with the plurality of radiation patterns, and receiving feed locations for a plurality of feeds of a waveguide to an antenna aperture surface of an antenna. The feed locations may be spatially-defined positions on the waveguide. The example method may further comprise defining a grid on the antenna aperture surface, where the grid defines a plurality of resonator locations. The example method may further comprise placing a metasurface resonator at a first resonator location of the plurality of resonator locations that exhibits a minimum error relative to the desired source field and satisfies a maximum error threshold relative to the desired source field. The metasurface resonator may be determined, by the processing circuitry, based on the feed locations and a plurality of degrees of freedom for the first resonator location. The example method may further comprise discarding a second resonator location of the plurality of resonator locations in response to determining, by the processing circuitry, that no metasurface resonator at the second resonator location satisfies the maximum error threshold relative to the desired source field. The plurality of degrees of freedom comprise metasurface resonator geometries that exhibit different polarizabilities defined in a candidate library.

According to some example embodiments, a multifunctional antenna structure is provided that may be configured to generate a plurality of radiation patterns. The multifunctional antenna structure may comprise a waveguide, a plurality of feeds operably coupled to the waveguide, and an antenna aperture surface operably coupled to the waveguide and the plurality of feeds. The antenna aperture surface may comprise a plurality of metasurface resonators positioned on the antenna aperture surface to generate the plurality of radiation patterns. The positions of the plurality of metasurface resonators may be based on an iterative application of a plurality of degrees of freedom for a configuration of the metasurface resonators that exhibit less than a maximum error threshold relative to a desired source field associated with the plurality of radiation patterns.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 8A:
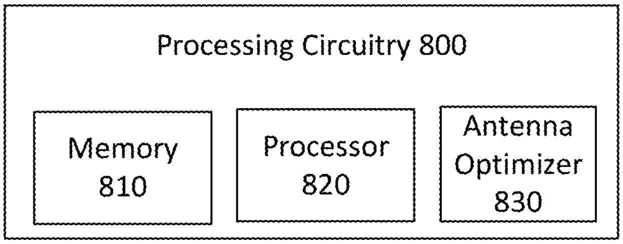
Figure 8B:
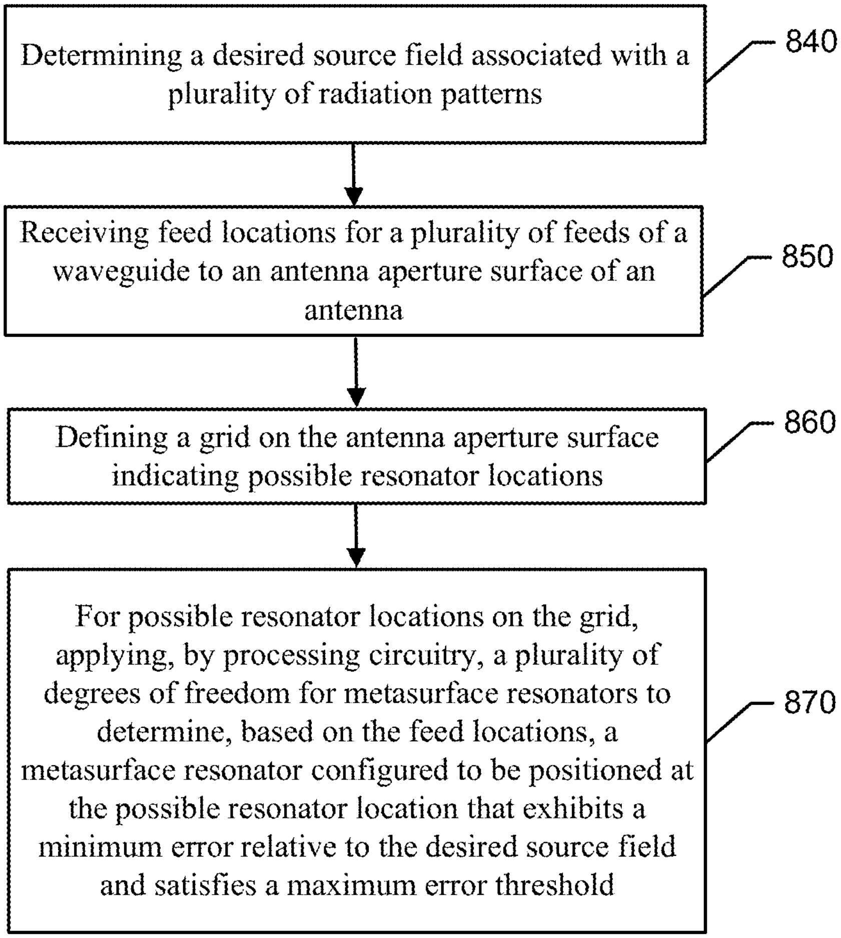
Figure 8C:
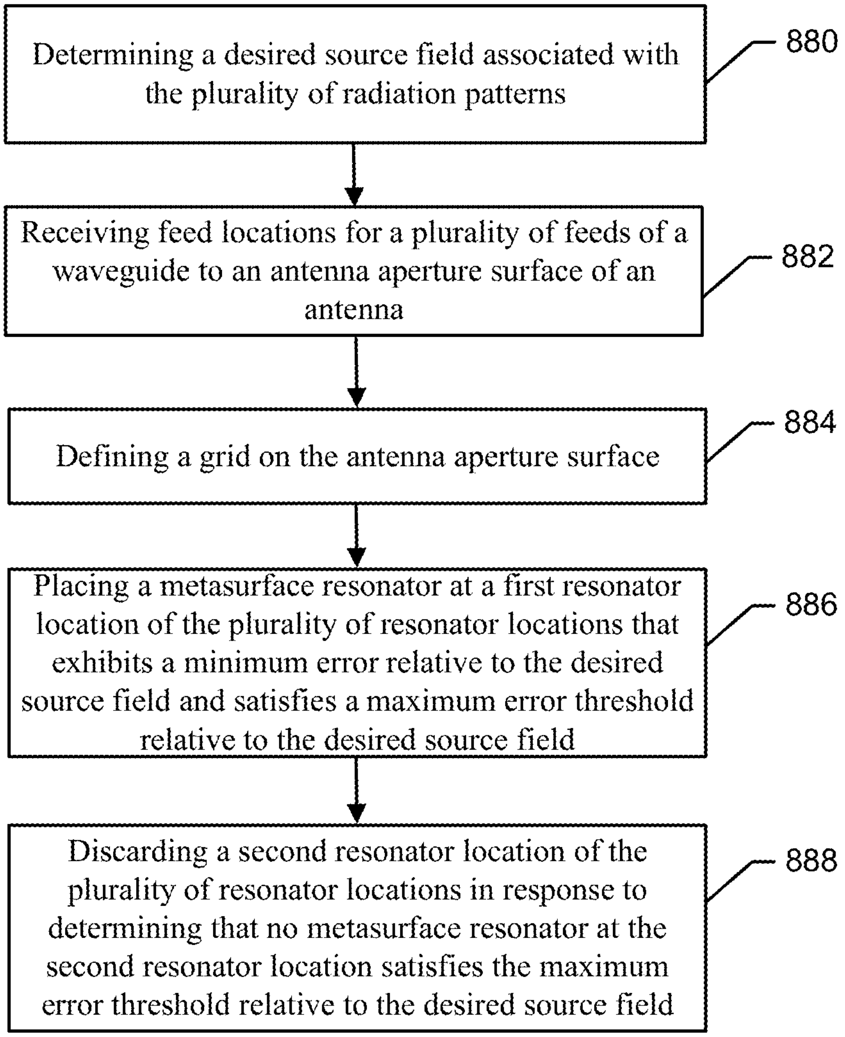

FIG. 8A illustrates a block diagram of processing circuitry configured to design and construct a multifunctional antenna structure configured to generate a plurality of radiation patterns according to some example embodiments; and FIG. 8B illustrates a flowchart of an example method for designing and constructing a multifunctional antenna structure configured to generate a plurality of radiation patterns according to some example embodiments; and FIG. 8C illustrates another flowchart of an example method for designing and constructing a multifunctional antenna structure configured to generate a plurality of radiation patterns according to some example embodiments.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

According to some example embodiments, antenna structures and methods of design are provided herein for a metasurface aperture antenna that can operate in a multi-functional manner with high application flexibility at a low cost, size, weight and power (C-SWaP). Antenna structures described herein may be constructed to provide tailored beamsteering and/or simultaneous beams capable of delivering varied data from multiple feeds. Further, the antenna structures may be tailored, not only to generate multiple beams, but also beams with differing polarizations and frequencies, either in isolation or simultaneously utilizing a waveguide-fed metasurface antenna platform.

According to some example embodiments, an antenna design and construction method is described that can be used to develop, in particular, waveguide-fed metasurface antennas that can generate such multiple distinct radiation patterns. Such radiation patterns may have different polarizations, frequencies, and/or beam angle. The aperture of antennas to generate the radiation patterns may be a passive or static aperture and, for example, a desired radiation pattern may be realized by using one of plurality of feeds of the antenna. Metasurface resonators constructed on the surface of the antenna may be structured (via a geometry) and positioned to realize the desired radiation patterns based on, for example, the positions of the feeds as well as variety of other factors (degrees of freedom). The locations of the metasurface resonators may be strategically determined by minimizing a difference (e.g., an error) between a realized source field radiation pattern and a desired source field radiation pattern. Such difference or error may be defined with respect to, for example, phase, magnitude, or both. In this regard, the locations of the metasurface resonators, the resonant behavior of each metasurface resonator, and the characteristics of the feeds may be some of a plurality of degrees of freedom that may be considered in the optimization method for designing and constructing a single antenna structure that is capable of providing a variety of multifunctional radiation patterns, for example, having differing attributes such as polarization, frequency, beam angle, etc.).

As further described herein, such antenna structures may be useful for a wide variety of applications, particularly due to the C-SWaP attributes and the beam flexibility that can be realized using such structures. For example, antenna structures constructed in accordance with various example embodiments may be leveraged in satellite communications applications, 5G applications, or the like. Additionally, such antenna structures may be leveraged in the context of computational imaging, synthetic aperture radar, MIMO communications, subwavelength focusing for WiFi communications, and more.

As such, according to some example embodiments, metasurface antenna structures may be developed and optimized to exhibit multifunctional behavior. In some example embodiments, holographic design principles may be implemented to define an ensemble of source current, which may be realized through the waveguide-fed metasurface architecture. Such antenna structures may be implemented to steer a beam to multiple directions and/or deliver, for example, a circular polarization. Further, according to some example embodiments, the antenna structures may be fabricated via standard printed circuit board processes thereby realizing the low C-SWaP attributes and enabling functionalities and flexibilities similar to a phased array, however with significantly reduced overhead and complexity (e.g., amplifiers, digital/analog converters, filters, etc. that are specifically needed for phased array). It is therefore unexpected that such a multifunctional behavior may be realized without the power hungry, expensive, and more complicated designs of phased arrays, particularly as the scale increases.

Beamsteering capabilities may be performed by various example embodiments via a mode of operation where an antenna structure is able to switch from one set of source fields to another set of source fields such that the farfield is modified accordingly. As such, each set of source fields may be considered as a single aperture distribution, and the different source fields across the same surface may collectively operate to address a shared aperture problem. Shared aperture antennas, such as the antenna structures defined in accordance with various example embodiments, may be more generally defined as multifunctional antennas where the same aperture space may be utilized toward multiple distinct radiation patterns. According to some example embodiments, the antenna structures may be switchable in terms of polarization, frequency, beam shape, etc. For electrically large antennas, the benefits may include the ability to realize multiple, high-directivity patterns generated without having to tile antennas or occupy more space such as with conventional phased arrays. Additionally, by leveraging waveguide-fed metasurface antenna structures, as opposed to conventional phased arrays, the burden of realizing multifunctional behavior may be placed on a computational modeling and design approach prior to construction of the antenna structure, rather than reliant upon operation of complex RF hardware. These considerations, combined with the feature that such antenna apertures can easily be manufactured via printed circuit board techniques, show that metasurface antenna structures, as defined in accordance with example embodiments herein, can realize a solution that takes on a relatively simple form factor that leverages significant computational effort to design, but not to operate. As such, according to some example embodiments, multiple radiation patterns may be engineered into an aperture surface of the antenna structure such that some or all functions can be achieved without creating significant deterioration for any single particular function. According to some example embodiments, using the approaches described herein, different form factors can be realized for antenna structures that solve the shared aperture problem in a distinct manner by leveraging waveguide-fed metasurface antenna structures.

According to some example embodiments, a waveguide-fed metasurface antenna structure may host a travelling wave that couples to subwavelength, resonant metamaterial elements, which may be referred to as metasurface resonators. The metasurface resonators may be geometrically structured and selectively patterned or positioned to elicit a desired electromagnetic response such as a steered beam or highly dispersive radiation patterns. In this manner, according to some example embodiments, large waveguide-fed metasurface aperture antennas may be created cost-effectively and with a low profile. Additionally, the architecture of the waveguide may allow for distribution of the signal across a large aperture, while the metasurface resonators may allow for tailoring of the scattered field and the resulting radiation pattern. The waveguide-fed metasurface antenna structures may allow for design and synthesis around a discrete, element-by-element procedure, as further described herein. Additionally, such antenna structures may leverage other antenna context variants including cavity-back metasurfaces, Huygens' metasurfaces, and Huygens' box antennas.

Additionally, according to some example embodiments, versatile antenna structures are provided with the flexibility to steer a beam to multiple directions in real-time and even direct several beams simultaneously. In addition to beamsteering capabilities, example methods and structures described herein may also address polarization switching and frequency diversity. As such, according to some example embodiments, operation of the antenna structures may use a single antenna fed at multiple locations, where each feed corresponds to a different radiation pattern. In this manner, the beam pattern generated by an antenna structure, according to some example embodiments, may be changed by switching to drive different feeds through the use of RF circuitry. Additionally or alternatively, separate bit streams may be sent to each of the different feeds to, for example, communicate with different users leveraging each beam. In either mode, the same antenna aperture surface is shared across the feeds and is capable of making a directive pattern, for example, from a low-profile and simple platform.

According to some example embodiments, antenna structures as described herein may be implemented as static or passive antennas which do not alter the response of the metasurface during operations. However, according to some example embodiments, dynamic or reconfigurable embodiments may be implemented where the antenna structure and associated aperture may include tuning components that can be operated to modify the response of each or groups of metasurface resonators through, for example, individual or group switching devices, such as switches or solid-state devices. The metasurface resonators that make up the metasurface of the antenna structure can be subwavelength elements which, in some instances, can complicate the input/output (TO) controls that dictate a dynamic metasurface response. However, according to some example embodiments, the metasurface resonators may be configured in parallel in the absence of specific control line, while in other example embodiments each metasurface resonator may have a dedicated control line. While the implementation of a dynamic metasurface antenna structure may offer some benefits with respect to control of the generated radiation patterns, a moderate to extreme relative increase in complexity and power draw may be a drawback of such an approach. However, some example embodiments comprise a dynamic metasurface structure that, for example, include switching devices to control (e.g., activate or deactivate) selected metasurface resonators to generate desired field characteristics.

As a waveguide-fed device, a continuum of homogenized surface impedances is not required, which may be the case in a surface-wave metasurface solution. According to some example embodiments, a waveguide-fed metasurface can have discretely defined elements in the form of metasurface resonators, which allows for different treatment of discontinuities and may remove certain design constraints. This can be helpful in multi-beam antenna structures attempting to balance between numerous source fields. As such, with waveguide-fed metasurface antenna structures, locations where a sharp change in the desired metasurface response can exist and they need not create a substantial discontinuity for the traveling wave. Therefore, waveguide-fed metasurface antenna structures can offer an option when such a response is desired.

Figure 1A:
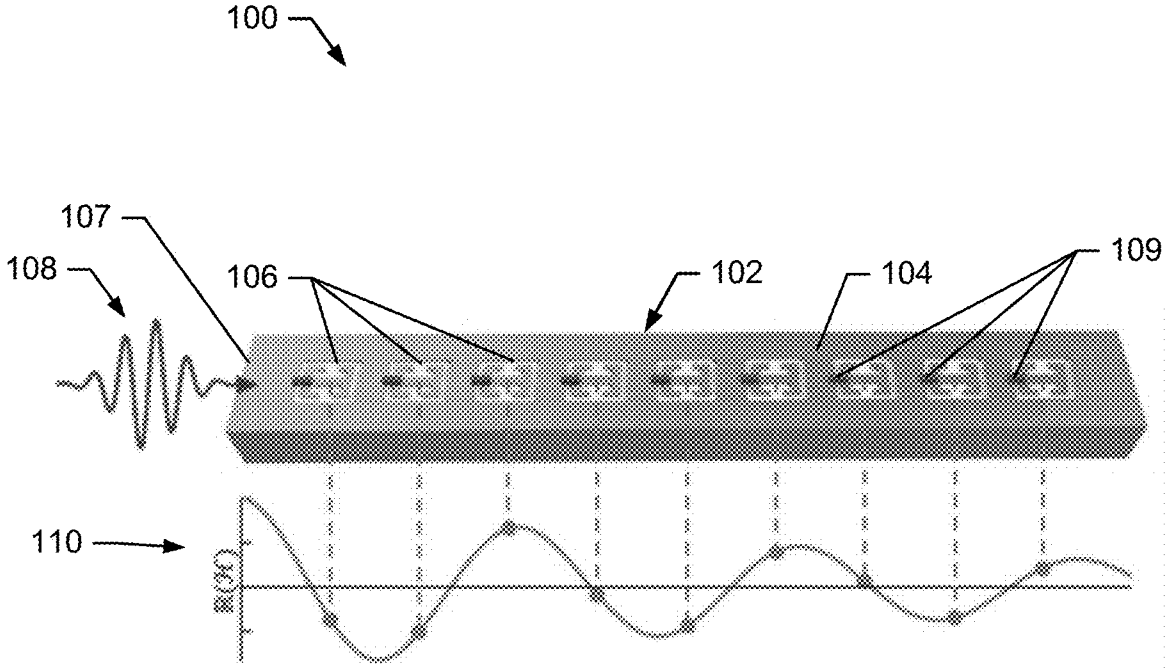
FIG. 1A illustrates an example one-dimensional antenna structure with metasurface resonators according to some example embodiments.

Referring now to FIG. 1A, an example one-dimensional antenna structure 100 is shown according to some example embodiments. The antenna structure 100 comprises a waveguide 102. The waveguide 102 may be formed with an internal channel that receives a feed signal 108 at a feed end 107. The waveguide 102 may also comprise an antenna aperture surface 104, upon which a plurality of metasurface resonators 106 may be formed. Although the metasurface resonators 106 in FIG. 1 are shown as being equally spaced and with identical structures, it is understood that positioning and structure of the metasurface resonators 106 are degrees of freedom for an optimal antenna structure design, as further described herein, according to some example embodiments. The metasurface resonators 106 are also shown as including control switches 109 as an example of a dynamic device, which may be included and implemented in some example embodiments that operate as a dynamically-controlled antenna structure, as described above. Such control switches 109 may be operable to tune the metasurface resonator 106 by changing a characteristic of a respective metasurface resonator 106 to, for example, cause the metasurface resonator 106 to no longer resonate, change resonant frequencies or beam angle, or the like.

Additionally, the field signal 110, R(H), based on the feed signal 108, is shown in FIG. 1. The effect of the metasurface resonators 106 to generate the field signal 110 can be seen due to the indicated alignment of the metasurface resonators 106 with the field signal 110. Although not shown in FIG. 1, the position of the feed, i.e., feed end 107, or of multiple feeds, and the position and structure of the metasurface resonators 106, as well as other degrees of freedom, may be optimized in accordance with desired radiation patterns based on methods described herein to determine the antenna structure 100.

Figure 1B:
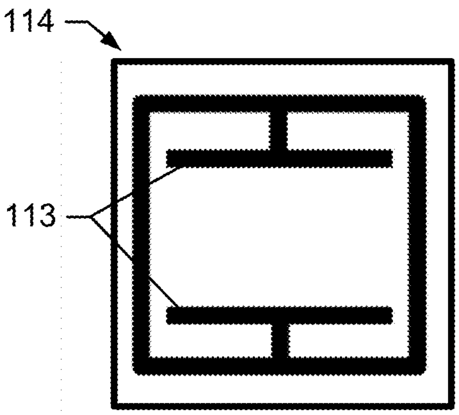
FIGS. 1B and 1C illustrate example metasurface resonators according to some example embodiments.
Figure 1C:
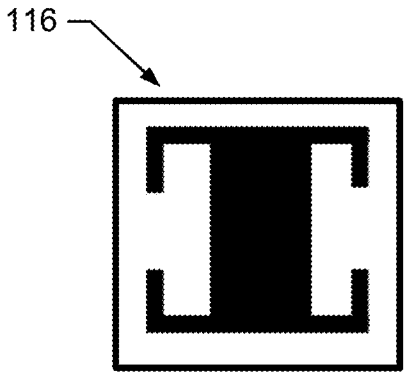

As shown in FIG. 1B, a zoomed top view of a metasurface resonator 114 having one type of geometry is provided, which could be used in various example embodiments of an antenna structure as described herein. FIG. 1C is a zoomed top view of another metasurface resonator 116 having another type of geometry, which could be used in various example embodiments of an antenna structure as described herein. The metasurface resonators 114 and 116 may be examples of metasurface resonators that could be used in the antenna structure 100 as metasurface resonators 106. In this regard, the metasurface resonators 114 and 116 may be formed as a complementary electric inductor-capacitor (cELC) resonator and may be subwavelength in size. The metasurface resonator 114 and 116 may be formed, for example, as machined or etched metal components using printed circuit board techniques on a substrate. The architecture of the metasurface resonators 114 and 116 are but two geometries that may be employed in a metasurface resonator. A variety of parameters of the metasurface resonators 114 and 116 may be modified in accordance with various example embodiments and cataloged in a library (e.g., a library of geometries) as described below for use in an optimization method. In this regard, thickness and distances between features of the metasurface resonators 114 and 116 may be changed to deliver different responses with respect to magnitude and phase, separately. For example, the distance between the cross bars 113 of the metasurface resonator 114 may be adjusted to be larger or smaller to, for example, change the response of the metasurface resonator 114 with respect to frequency. Additionally or alternatively, the length or width of the cross bars 113 may be adjusted to increase or decrease the capacitance of the metasurface resonator 114 having a resultant effect on the response. As mentioned above, an antenna structure according to some example embodiments may include metasurface resonators that are different structures and therefore different responses in contribution to the radiation pattern.

Figure 2:
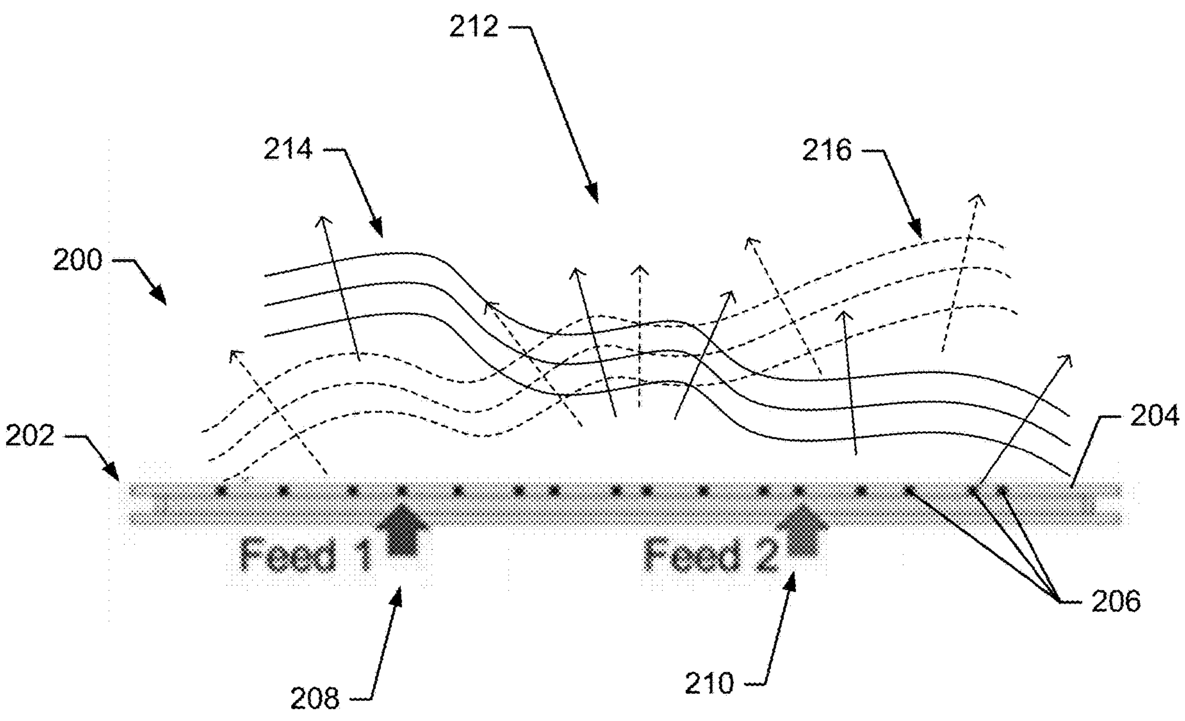
FIG. 2 illustrates an example antenna structure with metasurface resonators and example radiation patterns according to some example embodiments.

Now looking to FIG. 2, an example antenna structure 200, according to some example embodiments, having two feeds 208 and 210 is shown. Similar to the antenna structure 100, the antenna structure 200 may comprise metasurface resonators 206 disposed on an antenna aperture surface 204 of a waveguide 202. The metasurface resonators 206 are shown to have non-uniform positioning, relative to the antenna structure 100 of FIG. 1A. Additionally, the waveguide 202 of the antenna structure 200 may be configured to accept two feed signals 208 and 210 at differently positioned feed locations. Accordingly, the simultaneous provision of feed signal 208 with feed signal 210 generates a combined radiation pattern 212. This combined radiation pattern can be considered with respect to each feed signal. As such, feed signal 208 may cause the antenna structure 200 to generate the field 214 (solid lines) due to the feed location of the feed signal 208 and attributes of the feed signal 208 itself (e.g., frequency, power, phase, etc.). Similarly, feed signal 210 may cause the antenna structure 200 to generate the field 216 (dotted lines) due to the feed location of the feed signal 208 and attributes of the feed signal 208 itself (e.g., frequency, power, phase, etc.).

Figure 3:
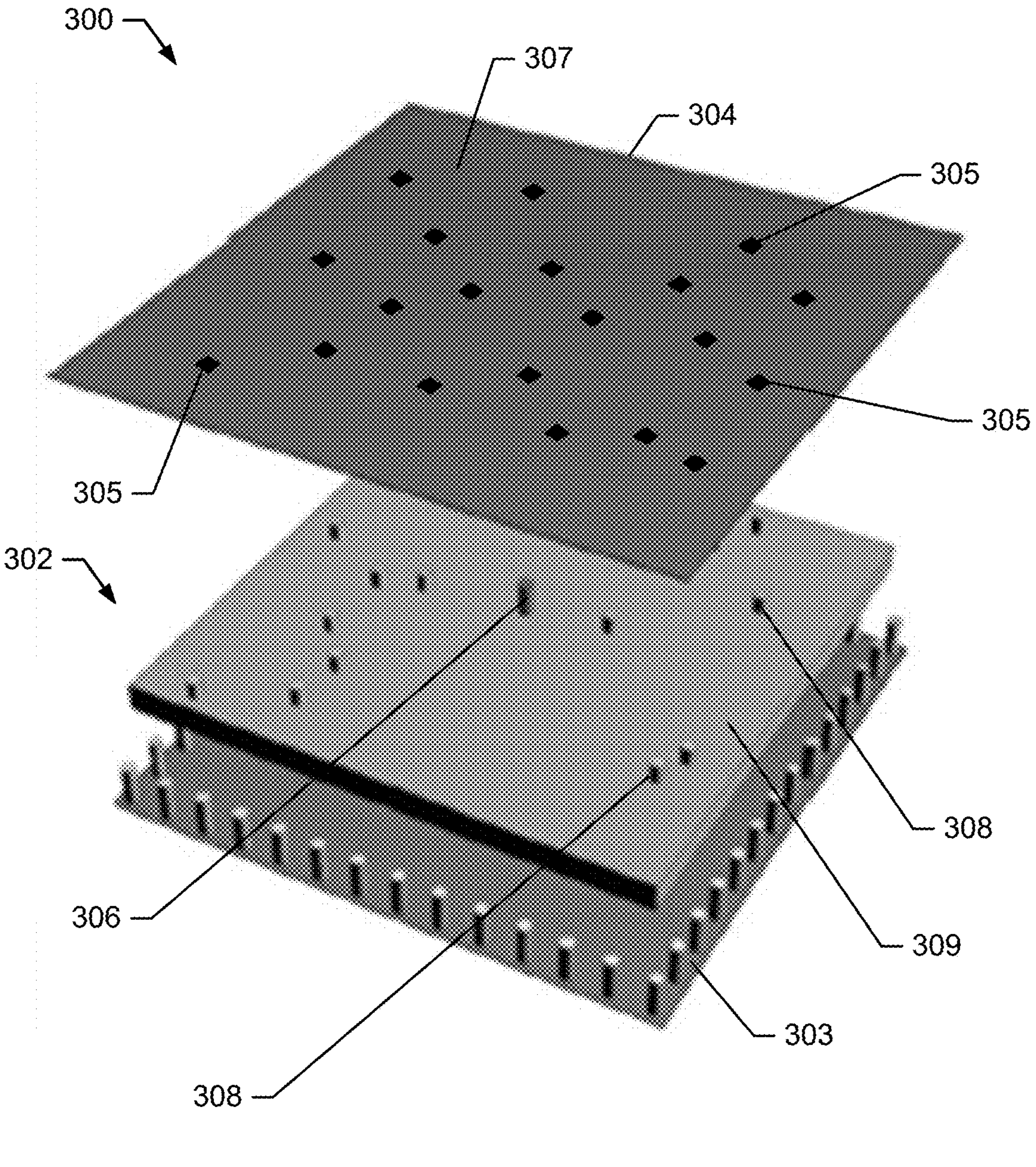
FIG. 3 illustrates an exploded view of a two-dimensional antenna structure comprising a parallel plate waveguide according to some example embodiments.

Referring now to FIG. 3, an exploded view of a two-dimensional antenna structure 300 is shown. In regard, the waveguide 302 may be a parallel plate waveguide (PPWG) with a first plate being a base 303 and the second plate 304 comprising the antenna aperture surface 307 upon which the metasurface resonators 305 are disposed. According to some example embodiments, the waveguide 302, as a PPWG, may allow for the dissemination of energy across a large two-dimensional antenna aperture surface 307 while the metasurface resonators 305 allow for flexibility in how the formed metasurface scatters the contained energy. As can be seen in FIG. 3, the feed 306 is included, which may be one of a number of feeds used to support generation of a related beam or the overall field of the antenna structure 300. In this regard, as further described below, based on, for example, the placement of the feed or feeds 306, the positions and structures of the metasurface resonators 305 may be optimized to obtain a desired radiation pattern output from the antenna structure 300. According to some example embodiments, the feed 306 may be a coaxial pin that penetrates into the waveguide 302 from the base 303 with a surrounding dielectric sheath that does not continue through the base 303. Additionally, the waveguide 302 may include one or more vias 308 (which may also be referred to as directors or prongs) and may provide further directivity to the guided wave traveling through the waveguide 302 by scattering energy along a plane of the antenna aperture surface 307, as further described herein. According to some example embodiments, the placement of the vias 308 may also be an output of an optimization method according to some example embodiments. Also, the waveguide 302 may include a dielectric core 309 having a defined thickness. According to some example embodiments, the dielectric core 309 may be, for example, clad on each side by a conductor such as metal (e.g., copper).

Figure 4:
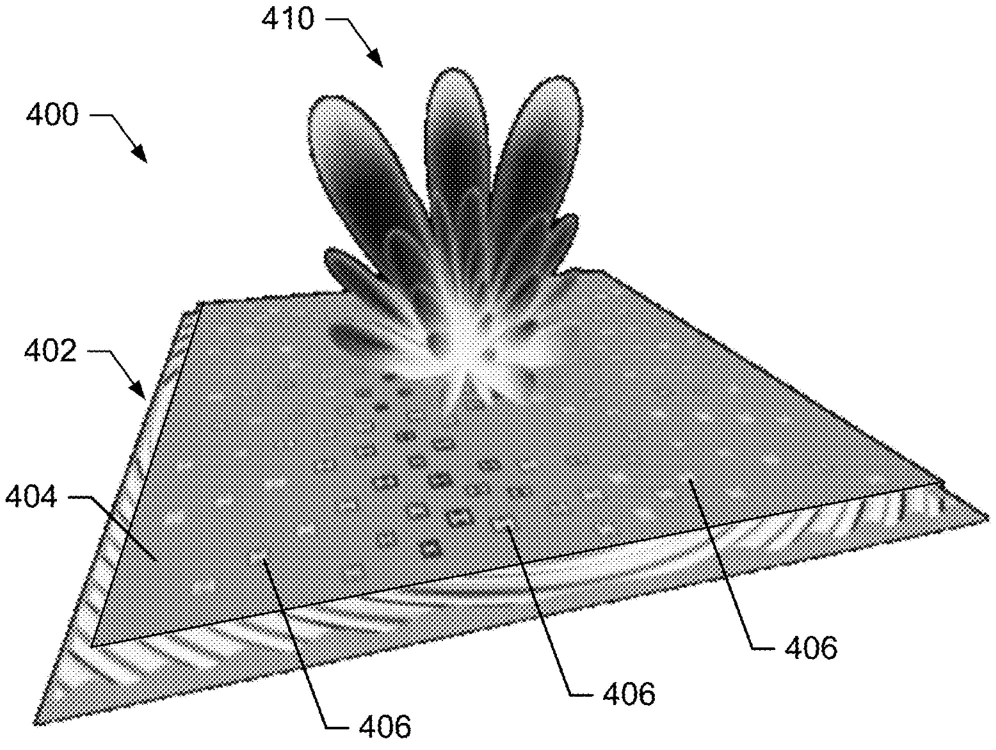
FIG. 4 illustrates a two-dimensional antenna structure comprising a parallel plate waveguide and a radiation pattern according to some example embodiments.

Accordingly, when assembled and operating as shown in FIG. 4, an example two-dimensional antenna structure 400 may provide a radiation pattern 410 when a selected feed, or multiple feeds, is used to provide a feed signal. Again, the antenna structure 400 may comprise a waveguide 402 and an antenna aperture surface 404, which may comprise a plurality of optimally positioned and structured metasurface resonators 406 as described herein. The waveguides 302 and 402 are examples of two-dimensional waveguides that may be used according to some example embodiments. However, other types of waveguides may be utilized, including, for example, three-dimensional waveguides. As such, example waveguides that may be used include parallel-plate waveguides, rectangular waveguides, circular waveguides, elliptical waveguides, single and double-ridged waveguides, elbow waveguides, or the like. Similarly, various geometries, and combinations of geometries, of metasurface resonators or cells may be used in accordance with various example embodiments, including metasurface resonators having a multi-layered architecture. For example, various types of metasurface resonator geometries may be utilized that are similar to metasurface resonator 114 and 116. Example geometries of metasurface resonators may have shapes such as dumbbell, spiral, H, U, V, arrow head dumbbell, concentric ring, split ring, interdigital, cross, circular head dumbbell, square head connected with U slots, open loop dumbbell, fractal, half-circle, meander lines, U-head dumbbell, double equilateral U, or the like.

The following describes aspects of the underlying physics and solutions based on the physics for waveguide-fed metasurface antenna structures, according to some example embodiments. In this regard, the guided wave and the metasurface resonators may be jointly modeled. According to some example embodiments, such modeling may involve a holographic synthesis process that defines a desired source field, based on a plurality of individual field patterns, for use in constructing an antenna structure (e.g., via placement of metasurface resonators) that can generate output fields that are the same or similar to the desired source field and the plurality of individual field patterns. According to some example embodiments, the metasurface resonators may be placed in close proximity to one another using a homogenization approach. Alternatively, the metasurface resonators may be separated by an appreciable distance, e.g., wavelength (κ) divided by two (λ/2), which may avoid strong mutual coupling and additional design and computational complexity. Focusing on such a separated approach, the subwavelength metasurface resonators may be modeled as effective electric and/or magnetic dipoles. The waveguide may have a defined electric and magnetic field which can couple to the metasurface resonators and thereby stimulate effective dipole moments. The coupling effects may occur between any field component and any dipole moment. However, according to some example embodiments, a scalar rendition may be used that considers only a single component of the guided wave's magnetic field and a single component of the effective magnetic dipole moment. In this regard, it will be appreciated that more detailed formulations may be utilized that expound upon this approach.

As such, an effective magnetic dipole $m_y$ may be considered, which may, for example, only be excited by the y-component of the guided magnetic field $H_y(\bar{\rho})$. Accordingly, the stimulated dipoles moment may be related to the magnetic field through the magnetic polarizability $\alpha_m$ as $$m_y = H_y \alpha_m.$$

Figure 5A:
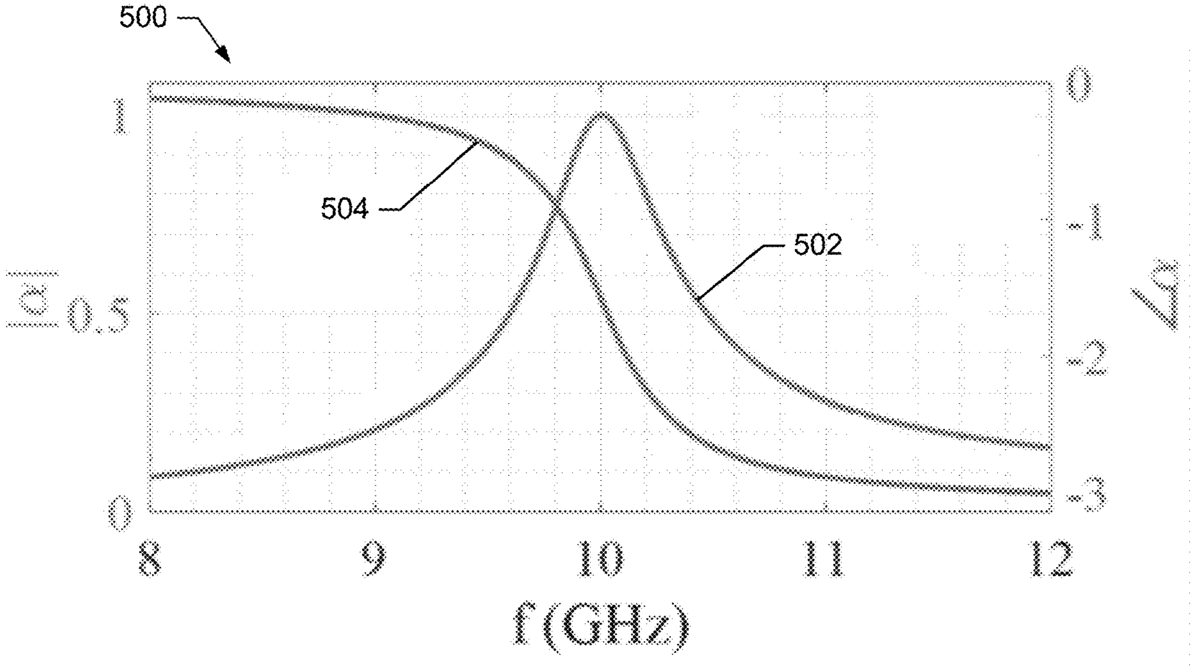
FIG. 5A shows a graph of magnitude and phase corresponding to polarizability of the metasurface resonator illustrated in FIG. 5B according to some example embodiments.
Figure 5B:
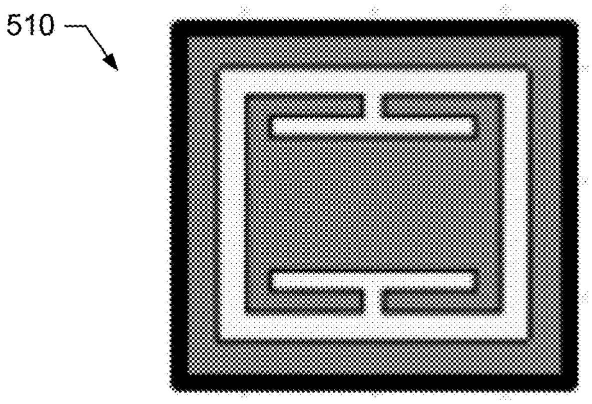
Figure 6A:
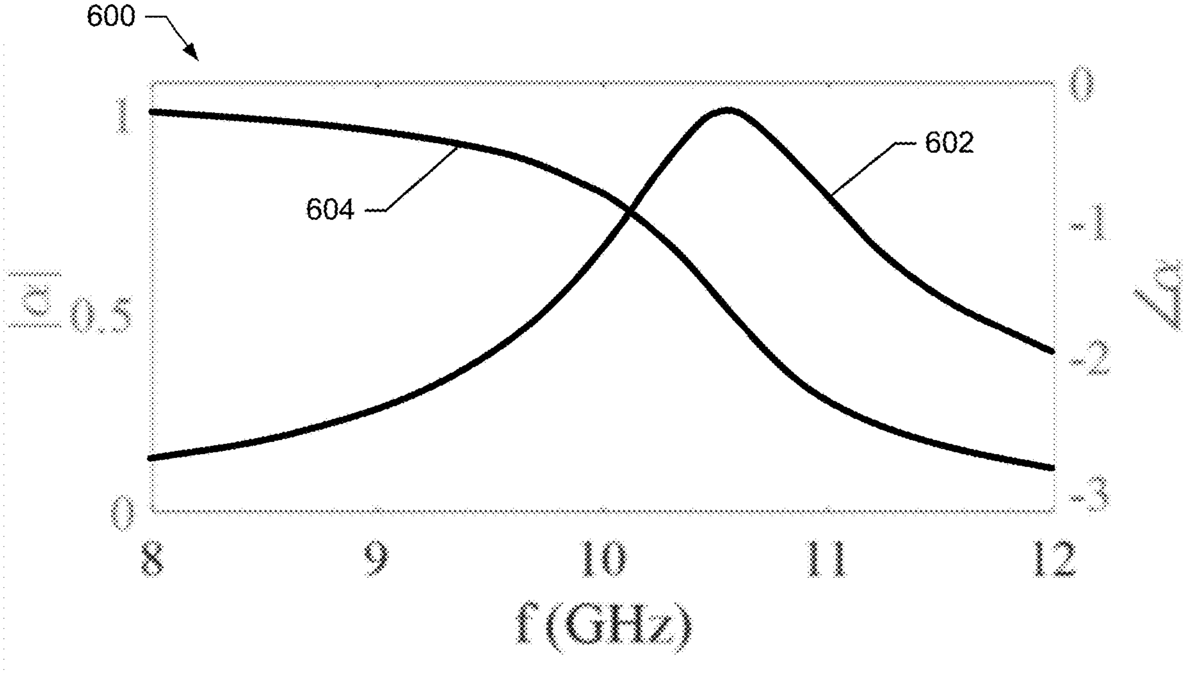
FIG. 6A shows a graph of magnitude and phase corresponding to polarizability of the metasurface resonator of FIG. 6B according to some example embodiments.
Figure 6B:
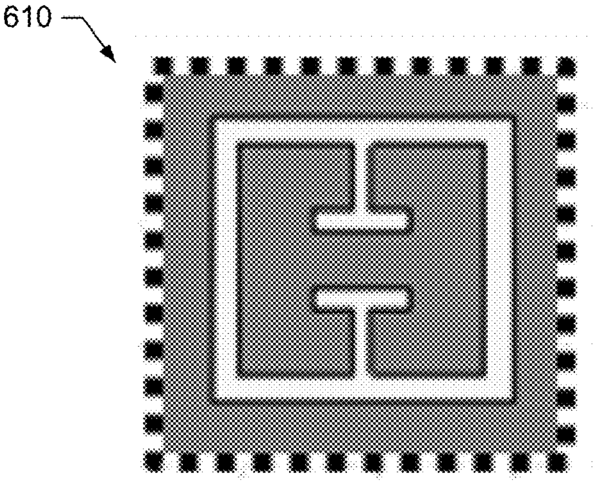

Within analytic frameworks, the polarizability can be conveniently modeled with a Lorentzian curve. This relationship may be given by $$\alpha_m = \frac{F\omega^2}{\omega_0^2 - \omega^2 + i\Gamma\omega}$$

where $$\Gamma = \omega_0/(2Q)$$

and Q is the quality factor of the metasurface resonator. The angular frequency and resonant frequency are given by ω and $\omega_0$. The quantities F and Γ account for the metasurface resonator's coupling strength and damping, which may depend on the overall size and the losses associated with the particular geometry of the metasurface resonator. In FIGS. 5A and 6A, graphs of a magnitude and phase corresponding to the polarizabilities of two different geometries of metasurface resonators are provided and the Lorentzian curves are drawn for the two example geometries. In this regard, for the geometry of metasurface resonator 510 in FIG. 5B, the graph 500 of FIG. 5A shows a magnitude 502 and a phase 504, where $f_0$=10 GHz and Q=10. For the geometry of metasurface resonator 610 in FIG. 6B, the graph 600 of FIG. 6A shows a magnitude 602 and a phase 604, where $f_0$=10.5 GHz and Q=5.

In view of these notional curves, the phase can be varied by manipulating the resonant frequency and Q of the metasurface resonator. Additionally, the magnitude and the phase can be inherently coupled, thereby highlighting a difficulty associated with designing holographic metasurfaces based on resonant elements. Also, the phase may be constrained to the range [0, π], which may affect antenna synthesis due to the restricted phase range for the metasurface resonator.

Further, the phase of the guided wave may also be involved in establishing the dipole's radiation phase. The guided wave may also be transverse electromagnetic (TEM) and the magnetic field may be defined by the zeroth order Hankel function of the second kind as $$H_{y,guided}=H_0^{(2)}(k\rho)\cos(\phi)$$

where {ρ, ϕ} are the polar coordinates of the metasurface resonator with the source at the origin, and $$k=2\pi\sqrt{\epsilon_r}/\lambda$$

is the propagation constant in the waveguide.

Once excited, each subwavelength metasurface resonator may radiate as a magnetic dipole and generate the field $$\overline{E}_{rad} = -k_0\omega\mu_0\frac{e^{ik_0|\overline{r}-\overline{p}|}}{4\pi|\overline{r}-\overline{p}|}m_y(\hat{y}\times\hat{r})$$

where $k_0$ is the free space wavenumber. The total radiated field may then be calculated by summing over all of the dipoles. Accordingly, a concise analytic framework may be defined. According to some example embodiments, it may be necessary to find corresponding metasurface resonator geometries that can be substituted for the analytic polarizabilities described above. Such a polarizability extraction process may involve simulating a single scattering element or metasurface resonator in isolation and then fitting the scattered field to find the dipole moment. As such, a discrete number of metasurface resonator geometries may be utilized which correspond to a set of desired polarizabilities. As such, a library of geometries may be generated and utilized in the optimization approach described herein.

The polarizabilities may also contribute in the holographic synthesis process. With respect to holographic synthesis, the relationship between farfield radiated patterns and effective source fields can be considered using, for example, a Fourier transform relationship. For a given farfield and a set of sources, effective electric or magnetic currents, can exist on the aperture. The effective magnetic current may be the continuous case of the effective magnetic dipoles. With the assumption of y-oriented magnetic dipoles, a horizontal linear polarization may be created from the aperture. For a uniform plane wave directed at angle {0, ϕ}, the field projected into the aperture plane can take the form $$E_{proj}=e^{i(k_xx+k_yy)}$$

where $$k_x=k_0\sin(\theta)\cos(\phi)$$

and $k_y=k_0\sin(\theta)\sin(\phi)$.

As such, a phase grating may be created across the aperture in, for example, precisely the same manner as a blazed grating. In one example embodiment, a desired phase profile of the radiated electric field projected into the plane may be utilized, which may be directly proportional to the effective magnetic currents, $$E_{proj}\propto J_{m,eff}$$

according to an equivalence principle. In the terminology of holography, an incident wave and an object wave may be interfered to find the necessary pattern for a hologram. Additionally, phase may be the essential factor which allows for a desired field to be crafted. The radiated wave may take the form of the object wave and the incident wave may be the underlying guided wave. The scattering effective dipoles may then constitute the hologram. The hologram may then be created by placing metasurface resonators in the aperture in consideration of the phase of the guided wave, and the phase of the projected field. According to some example embodiments, the design may involve tailoring polarizabilities and placing the polarizabilities selectively such that the effective magnetic currents can be phase matched to a desired object wave. As such, playback of the hologram may then be completed by generating the guided wave which can stimulate the metasurface resonators that emit and constructively interfere to recreate the objective wave.

To do so, an example optimization method may be implemented for designing an antenna structure that operates in this manner. As described above, a forward model may be generated and the surface of the antenna structure can be designed holographically by crafting effective surface currents. Such an approach can be applied when a single guided wave and a single radiated pattern are required. However, when multiple radiation patterns are desired, the problem evolves into an optimization challenge. To address the increased complexity, methods and associated algorithms are provided, according to some example embodiments, that minimize collective errors when attempting to satisfy multiple constraints in consideration of various degrees of freedom and metrics that are inputs and outputs of the design process.

Figure 7:
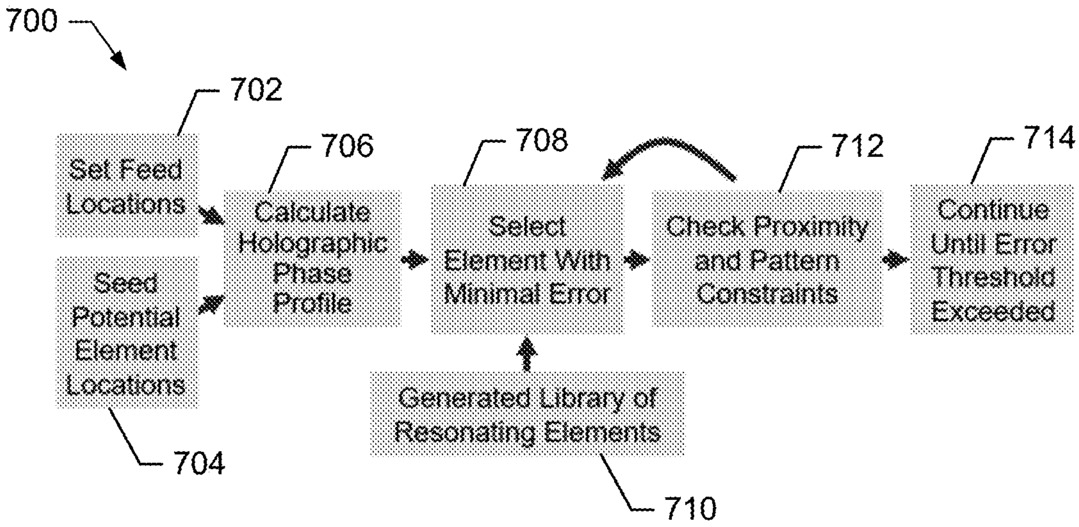
FIG. 7 is a flowchart of an example antenna optimization method according to some example embodiments.

According to some example embodiments, a flow chart of an example optimization method 700 is shown FIG. 7. In short, the example optimization method 700 may include setting feed locations at 702 and seeding potential element (metasurface resonator) locations at 704. Based on these, a holographic phase profile may be calculated at 706. At 708, an element with the minimal error may be selected and considered in view of a generated library of resonating elements at 710. At 712, a proximity check and pattern constraints may be considered, which may be repeated for each location of an element with a minimal error, such that proximity check and pattern constraints may be considered for each selected element from the library. Finally, at 714, the process may continue until the error threshold is exceeded, as further described below.

According to some example embodiments, the example optimization method 700 may comprise some precompute/preprocessing operations, such as the compilation of a resonating element (metasurface resonator) library and determination of some geometric factors including the size and dimensions of the aperture. Subsequently, a grid may be defined on the aperture (e.g., the antenna aperture surface), and the grid may be uniform or non-uniform. The candidate resonating elements, for example, in the element library may be selected and assigned to locations on the aperture in an iterative fashion considering each candidate within the library. The locations may be referenced based on the grid coordinates. According to some example embodiments, a resonating element may be selected and positioned based on whether, and to what degree, the resonating element jointly satisfies all of the desired radiation patterns based on a difference between a determined phase profile with the inclusion of the resonating element and the desired source field and/or radiation field patterns.

For the optimization of a single pattern, the desired source fields and the guided wave may be defined on the grid. In this regard, according to some example embodiments, a very fine grid may be used where, for example, iterations are λ/100 or less. Use of such a fine grid may ensure that the phase of the guided wave is fully probed. The propagation phase of the guided wave may, in part, be operating as n-bit phase shifters found in phased arrays, so that dense sampling can allow for more finely tuned phase values. The desired phase, associated with the desired source field, that the metasurface can impart may then be calculated on the guided wave as the guided wave scatters into the objective wave as $$\angle U_{holo}=\angle J_{m,eff}-\angle H_{y,guided}.$$

Since the metasurface may only be capable of scattering within a limited phase space, the antenna structure may be designed to generate a field that aligns with a desired holographic profile within a threshold difference, if a perfect match is not possible. For a desired holographic profile, the Lorentzian-response of the metasurface resonator may limit the phase range to be [0, a]. In practice, a smaller phase interval may be achievable based on the metasurface resonators within the library. Substituting in for the j-th candidate metasurface resonator from the library, an error relative to a desired holographic profile can then be computed that is associated with placing a metasurface resonator at that location in the aperture as $$Err_{single,j}=|\angle U_{holo}-\angle \alpha_j|.$$

In the above, the error is represented for a single beam pattern and a single feed. The index j allows for computation of an error value for a collection of available polarizabilities and associated metasurface resonator geometries from the library. In the more general case, the error for numerous patterns can be calculated, indexed by i, with $$Err_{i,j}=|\angle U_{i,holo}-\angle \alpha_j|.$$

and then sum the results to obtain a total error for each available polarizability $$Err_{sum,j}=\sum_i Err_{ij}.$$

If the feeds are relatively far away from each other, the error can be de-emphasized associated with metasurface resonators that do not contribute significantly to a particular feed's radiation pattern using a weighting multiplier. The weighting may be implemented by substituting the product $$|H_{i,y,guided}|\times Err_{ij}$$

for the summand.

The operation of minimizing the error can be completed across the entire aperture. As such, for each location, the polarizability may be selected so that collective error is minimized for all desired holograms. An error of zero for a single pattern may be readily determined. Additionally, at a collection of points, an error of zero or near zero may also be determined for two patterns, since two patterns may still exhibit and ability to construct an antenna with a close match to the two pattern field. However, when considering more than two patterns, a close match may be difficult to achieve and therefore the goal can be to minimize the error (i.e., a difference between a realizable field and the desired source field), since it may be unrealistic to have a high-quality match for all patterns, particularly when more than two patterns are considered. However, if the determined error is substantial, that is even the minimum error for the selected metasurface resonators from the library is greater than a maximum error threshold, then, according to some example embodiments, no metasurface resonator may be placed at that location, and the process may proceed to evaluate a next possible location. As such, an error threshold τ (e.g., a maximum error threshold) may be defined for this purpose. In this regard, when $$Err_{sum,j}<\tau$$

for all j, no element will be placed.

According to some example embodiments, a proximity constraint can be incorporated into the process to, for example, reduce the number of metasurface resonators and thereby thin out the aperture. Such a proximity constraint can be implemented due to, in some example embodiments, the metasurface resonators being relatively small in size (e.g., smaller than λ/100). As an additional consideration, strong mutual coupling can be considered and prevented among the metasurface resonators or else the targeted polarizabilities may not be independent and easily matched in fabrication. Accordingly, to circumvent this issue, a sequential placement procedure may be implemented. Among all locations for metasurface resonators in the aperture, a minimal error placement for the corresponding metasurface resonator may be identified. All locations within a given proximity may then be removed from the pool of available locations. Then, a next metasurface resonator may be placed and the process may be repeated for another metasurface resonator. According to some example embodiments, a no-go proximity zone of, for example, λ/2 may be defined around each selected metasurface resonator. A similar proximity constraint may also be incorporated to keep elements from being too close to the feeds.

Given the example procedure, several parameters may remain to control as part of the example optimization process. A first parameter may be the stopping error threshold τ. The stopping error threshold may operate to stop the algorithm from adding further metasurface resonators once a determination is made that the metasurface resonators are doing more harm than good with respect to the error. In effect, error threshold may therefore limit the number of metasurface resonators in the aperture.

Another set of input parameters that may be considered relate to the phase of the available possibilities in the library. A wider phase span can mean that there is a better chance that one of the available metasurface resonators can reduce the overall error, e.g., the overall phase error. Further, this phase interval $I_{phases}$ may be applied to define a finite number of metasurface resonators, $N_{phases}$. For example, for $I_{phases}=\pi$ and $N_{phases}=11$, a collection of elements may be identified as $\{0, \pi/10, \ldots, \pi\}$.

As another set of parameters for the optimization method, additional consideration may be given to the phase of the guided wave. The guided wave may be defined up to an arbitrary phase constant by multiplying by an additional factor of $e^{i\Phi}$. Each of the feeds may be permitted to have a respective arbitrary phase, adding the collection of parameters $\{\phi_1, \ldots, \phi_M\}$ for M feeds. However, in some instances, these parameters may have no bearing on the final performance of the aperture if each feed is independent. The physical equivalent may simply correspond to adding a delay line into the feed. The effect on the optimization method may be indicated by the nulls in the $Err_{ij}$ maps. If the phase of, for example, a first feed is adjusted, the nulls which form rings around the feed can shift inward or outward. Consequentially, the minimal errors will be found at alternate locations and a new set of metasurface resonators and locations can result and be implemented. The input parameters $\tau$, $I_{phases}$, and $N_{phases}$ may each be rooted in changing the physics of the problem toward a specific goal. The feed phases can have a more random effect since the value is arbitrary. Therefore, in the optimization method, the $\phi_i$ values may be utilized to extend the method in, for example, a Monte Carlo approach. By sweeping all of these parameters collectively, a holographic patterning can be determined that best satisfies the figures of merit and thus the desired holographic pattern.

To assess the performance of an optimized holographic pattern, the farfield radiation may be determined. Additionally, the side lobe level (SLL) and directivity (D) may be tracked. Holographic patterns may have an associated SLL and D, and therefore for multi-pattern optimization, an average across the ensemble may be tracked. In some embodiments, the directivity, and not the gain, may be tracked, because the forward model may not satisfy conservation of power. In other words, energy that may have leaked as radiation need not be subtracted from the propagating wave. Once a large number of simulations (e.g., a threshold number) has been completed, the best combination of SLL and D may be chosen and the corresponding configuration may be implemented.

Based on the forgoing, it is noted that the set of inputs and outputs indicated above for the optimization method is not exhaustive. For example, the feeds may be moved to various locations and the correlations between the feeds and the respective patterns may also be changed. Further, figures of merit such as efficiency may be considered in some example embodiments. The overall efficiency may be most tightly coupled to the threshold $\tau$ because this parameter most strongly controls the overall number of metasurface resonators in the aperture, according to some example embodiments. Additionally, multiple feeds may be excited simultaneously with defined relative phases, which may also be considered by the optimization method.

In implementation, the forward model, holographic synthesis, and optimization process may be utilized as described herein. Additionally, to realize an antenna structure design, the polarizabilities, the feeding circuitry, and a full-wave simulation may also be used. Physical structures that produce the modeled response can be determined, which may involve considerations beyond the assumptions of ideal polarizable metasurface resonators and ideal feed waves. In this regard, full wave simulations may be leveraged that would more closely indicate real-world design solutions.

To excite the guided wave in a PPWG (e.g., waveguide 302 of FIG. 3), a coaxial feed may be used that may be inserted into the structure from the rear or base plate with the metasurface resonators on the opposite plate, i.e., the plate forming the aperture and associated surface (e.g., antenna aperture surface 307). For example, a purely cylindrical guided wave may be created in this manner. Alternatively, rather than using a cylindrical feed, a more refined feeding geometry with director prongs may be used in the form of vias, similar to vias 308. In this manner, a greater portion of the feed wave may be permitted to couple to the y-oriented dipoles (i.e., the y-oriented dipoles). If the feed is isotropic, then 50% of the energy can be carried in the $H_x$ components and 50% in the $H_y$ components. The feed vias (or directors) may scatter energy into the positive or negative x direction, which may increase the power density in the $H_y$ component. In an example embodiment, in the absence of the metasurface resonators, the power contained in the $H_x$ component may be approximately 31% of the total inserted power, which in some instances may limit the efficiency to be less than 69%. To overcome this efficiency limit, both the $H_x$ and $H_y$ components of the guided magnetic field may be coupled. The vias or directors may also have the benefit of reducing the coupling between feeds (i.e., from port-to-port).

Further, utilizing the vias can also facilitate the ability to achieve an impedance match in the band of interest while attaining the desired effect of more energy in the $H_y$ component. As such, the collective feed may be modeled as a superposition of effective line sources at the feed and the vias. To account for the scattering contribution of the vias, a fitting procedure, according to some example embodiments, may be used where complex amplitudes may be leveraged for the effective line sources to vary and fit the inserted magnetic field along a circle within the PPWG. Such a fitting may be performed using the Levenberg-Marquardt algorithm. The inclusion and positioning of such vias may offer yet another degree of freedom for generation of desired radiation patterns, and the placement of the vias may be determined based on the positioning of the feeds and the metasurface resonators.

According to some example embodiments, a similar process may be performed to extract the response of metasurface resonators. A feed wave in the PPWG may stimulate the metasurface resonator and its scattered field may be used to counter the polarizability of the metasurface resonator and consider the externally radiated field. The externally radiated field may be considered, for example, under the assumption that the fields in the waveguide are not scattered so substantially that the guided wave is not perturbed enough to degrade performance. Accordingly, the extraction process may be performed on a number of unique metasurface resonator geometries (e.g., 450 different geometries) with adjusted dimensions. Once the polarizabilities are extracted, the useful metasurface resonators may be identified that correspond with the optimized model. To select metasurface resonators from the various simulated geometries, a sorting may be performed based on the phases of $\alpha$ in ascending order. The corresponding magnitudes may then be considered and metasurface resonator geometries that do not have $|\alpha|>\tau_\alpha$ may be discarded, thereby setting a threshold to maintain a reasonable radiation efficiency. The remaining metasurface resonators may have phases spanning an interval $I_{phases}$, that can be divided into a discrete number of equally spaced phase options, $N_{phases}$. These metasurface resonators may then be corresponded and placed within the aperture according to example embodiments of the optimization method.

In view of the description above, various additional example embodiments will now be described. In this regard, according to some example embodiments, a method for constructing a multifunctional antenna structure configured to generate a plurality of radiation patterns is provided. According to some example embodiments, the method may be executed by processing circuitry as shown in FIG. 8. In this regard, FIG. 8 illustrates a block diagram of processing circuitry 800 which may comprise a memory 810, a processor 820, and an antenna optimizer 830. The memory 810 may be a non-transitory memory device configured to store data and instructions (e.g., software instructions) for execution by a processor (e.g., processor 820). The processor 820 may be a hardware processing device configured to execute functionalities based on inputs to provide outputs. The processor 820, according to some example embodiments, may operate as a hardware executor of instructions stored, for example, on a memory device, such as the memory 810. As such, the processor 820, and thus the processing circuitry 800, may be configured, via execution of instructions, to perform the functionalities described herein. Alternatively, the processor 820 may be a hardware configured device in the form of, for example, a field programmable gate array (FPGA) or an application specific integrated circuit (ASIC) configured to perform the functionalities described herein.

The processing circuitry 800 may also comprise an antenna optimizer 830 which may be embodied in the memory 810 and/or the processor 820 for implementation. As such, the antenna optimizer 830 may be configured to perform an antenna optimization method for design and construction of a multifunctional antenna structure that is configured to generate a plurality of desired radiation patterns for a given application. The antenna optimizer 830 may be configured to perform an antenna optimization method such as those described herein and the various example methods described with respect to the flowchart of FIG. 8B. The performance of an antenna optimization method as described herein is rooted in computer technology because the iterative process can be multi-dimensional with respect to the degrees of freedom and achieve a rapid convergence to a solution that determines a resultant antenna structure.

FIG. 8B illustrates a flowchart of an example method for constructing a multifunctional antenna structure configured to generate a plurality of radiation patterns. In this regard, the example method may comprise, at 840, determining a desired source field associated with the plurality of radiation patterns. According to some example embodiments, the desired source field may be determined via a holographic synthesis process that is based on the plurality of radiation patterns. The example method may also comprise, at 850, receiving feed locations for a plurality of feeds of a waveguide to an antenna aperture surface of an antenna. In this regard, according to some example embodiments, a feed of the plurality of feeds may be associated with a respective radiation pattern of the plurality of radiation patterns. However, the radiation patterns may be generated based on two or more feeds being operated simultaneously that may be additive (i.e., constructive fields), subtractive (i.e., destructive fields), or components of both. Further, at 860, the example method may comprise defining a grid on the antenna aperture surface, where the grid indicates possible resonator locations. According to some example embodiments, the grid may be a uniform grid defined as a collection of equidistant grid positions, as possible resonator locations, where the grid positions may having a square or rhomboid-shaped characteristic. However, according to some example embodiments, the grid may be defined as a non-uniform grid where, for example, the grid positions are defined based on a non-linear spatial function or pseudo-randomly. At 870, the example method may comprise for possible resonator locations on the grid, applying, by processing circuitry (e.g., processing circuitry 800), a plurality of degrees of freedom for metasurface resonators to determine, based on the feed locations, a metasurface resonator, selected from the library of metasurface resonators, configured to be positioned at the possible resonator location that exhibits a minimum error (e.g., minimum phase error) relative to the desired source field and satisfies a maximum error threshold (e.g., maximum phase error threshold) relative to the desired source field. In this regard, if application of the plurality of degrees of freedom for metasurface resonators to the possible resonator location does not determine a metasurface resonator that satisfies the maximum error threshold (e.g., maximum phase error threshold), then no metasurface resonator may be positioned at the possible resonator location. Additionally, the plurality of degrees of freedom may comprise metasurface resonator geometries that exhibit different polarizabilities defined in a candidate library.

Additionally, according to some example embodiments, applying the plurality of degrees of freedom for metasurface resonators may further comprise implementing a resonator proximity constraint between metasurface resonators such that no metasurface resonator is within a threshold distance of another metasurface resonator. Additionally or alternatively, according to some example embodiments, applying the plurality of degrees of freedom for metasurface resonators may further comprise implementing a feed proximity constraint such that no metasurface resonator is within a threshold distance of any of the plurality of feeds.

Additionally or alternatively, according to some example embodiments, the metasurface resonator geometries that exhibit different polarizabilities defined in the candidate library may be defined with respect to a defined phase interval. Additionally or alternatively, according to some example embodiments, applying the plurality of degrees of freedom for metasurface resonators may further comprise varying a phase of the plurality of feeds. Additionally or alternatively, according to some example embodiments, the waveguide is a parallel plate waveguide. Additionally or alternatively, according to some example embodiments, at least some of the plurality of radiation patterns may have different polarizations, frequencies, and/or beam angles. Additionally or alternatively, according to some example embodiments, the metasurface resonators may be complementary electric inductor-capacitor (cELC) resonators. Additionally or alternatively, according to some example embodiments, determining a desired source field associated with the plurality of radiation patterns may comprise performing a holographic synthesis of the plurality of radiation patterns. Additionally or alternatively, according to some example embodiments, the example method may further comprise determining, based on the desired source field, a number of feeds of the plurality of feeds and the feed locations of the plurality of feeds. Additionally or alternatively, according to some example embodiments, the grid may be non-uniform (i.e., non-rectangular). Additionally or alternatively, according to some example embodiments, the metasurface resonator geometries of the candidate library may exhibit different phases and magnitudes. Additionally or alternatively, according to some example embodiments, the plurality of degrees of freedom for metasurface resonators further comprises externally controlled dynamic devices for tuning the metasurface resonators. Such externally controlled dynamic devices may be embodied as, for example, a controllable switch, and may be operable to change a characteristic of a respective metasurface resonator to, for example, cause the metasurface resonator to no longer resonate, change resonant frequencies or beam angles, or the like.

FIG. 8C illustrates a flowchart of another example method for constructing a multifunctional antenna structure configured to generate a plurality of radiation patterns. In this regard, the example method may comprise, at 880, determining (e.g., by processing circuitry) a desired source field associated with the plurality of radiation patterns, and, at 882, receiving feed locations for a plurality of feeds of a waveguide to an antenna aperture surface of an antenna. The feed locations may be spatially-defined positions on the waveguide. The example method may also comprise, at 884, defining a grid on the antenna aperture surface, where the grid defines a plurality of resonator locations. The example method may further comprise, at 886, placing a metasurface resonator at a first resonator location of the plurality of resonator locations that exhibits a minimum error relative to the desired source field and satisfies a maximum error threshold relative to the desired source field. The metasurface resonator may be determined (e.g., by processing circuitry), based on the feed locations and a plurality of degrees of freedom for the first resonator location. The example method may also comprise, at 888, discarding a second resonator location of the plurality of resonator locations in response to determining (e.g., by processing circuitry) that no metasurface resonator at the second resonator location satisfies the maximum error threshold. In this regard, the plurality of degrees of freedom may comprise metasurface resonator geometries that exhibit different polarizabilities defined in a candidate library.

According to some example embodiments, placing the metasurface resonator may further comprise implementing a resonator proximity constraint between metasurface resonators such that no metasurface resonator is placed within a threshold distance of another metasurface resonator. Additionally or alternatively, placing the metasurface resonator may further comprise implementing a feed proximity constraint such that no metasurface resonator is within a threshold distance of any of the plurality of feeds. Additionally or alternatively, the metasurface resonator geometries that exhibit different polarizabilities defined in the candidate library may be defined with respect to a defined phase interval. Additionally or alternatively, determining the minimum error may comprise varying a phase of each of the plurality of feeds. Additionally or alternatively, the waveguide may be a parallel plate waveguide. Additionally or alternatively, at least some of radiation patterns of the plurality of radiation patterns may have a different polarization, frequency, or beam angle. Additionally or alternatively, the metasurface resonators may be complementary electric inductor-capacitor (cELC) resonators. Additionally or alternatively, determining the desired source field for the plurality of radiation patterns may comprise performing a holographic synthesis of the plurality of radiation patterns. Additionally or alternatively, the example method may comprise determining, based on the desired source field, a number of feeds of the plurality of feeds and the feed locations of the plurality of feeds. Additionally or alternatively, the grid may be non-uniform. Additionally or alternatively, the metasurface resonator geometries of the candidate library may exhibit different phases and magnitudes. Additionally or alternatively, the plurality of degrees of freedom for metasurface resonators may further comprise externally controlled dynamic devices configured to tune the metasurface resonators.

Following from the foregoing, a number of different factor and degrees of freedom may be implemented in example embodiments that determine an antenna structure. In this regard, according to some example embodiments, the context of a two-dimensional waveguide-fed metasurface antenna may be a contributing factor to the optimization method. Example embodiments may be implemented in the context of either a one-dimensional solution, a two-dimensional, or three-dimensional solutions, however, the optimization method may be different for each context.

With respect to the degrees of freedom or input variables that may be considered in an optimization process as described herein, the degrees of freedom may include the number of feeds that are used. Additionally or alternatively, the locations of the feeds may be a degree of freedom to the analysis. According to some example embodiments, the feeds may be located around the periphery of the antenna aperture or the feeds may be placed within the interior of the waveguide. Additionally or alternatively, according to some example embodiments, the relative phases of the feeds may be a factor that is considered in the optimization method.

As indicated above, the locations of the metasurface resonators may be determined based on, for example, the feed phase. However, the feed phase may be arbitrary from a performance perspective. Therefore, phase of a feed may be changed as a degree of freedom within the optimization method, and a set of metasurface resonators and associated positions may be determined, which may result in an improvement (i.e., a reduced error relative to the phase profile of the desired source field). Accordingly, each phase of each feed may be optimized in this way. Additionally, a radiation pattern that feeds generate within waveguide may also be degree of freedom related to the feeds that may be considered. In this regard, the feeds can create electromagnetic fields in the waveguide, and therefore a feed placed in the center of the antenna aperture surface may emanate a cylindrical wave. However, in a more complex case, if the feed is positioned on an edge of the antenna aperture surface, the feed may create a half-cylindrical wave that travels away from the edge. Further, the wave can have more complex patterns, for example, by having an amplitude that varies as a function of angle.

Additionally, according to some example embodiments, the number of feeds for the antenna structure may be excited by a signal individually or simultaneously to generate a desired radiation pattern. In this regard, for example, feeds may be excited one at a time. However, according to some example embodiments, some or all of the feeds may be excited at the same time, which may allow for switching between patterns by changing, for example, the relative phases.

As indicated above, the locations of the metasurface resonators may be a degree of freedom that is considered according to some example embodiments. In this regard, the metasurface resonator may be considered and placed on a periodic lattice grid or may be placed on a non-uniform grid with no periodicity. According to some example embodiments, the metasurface resonator may not overlap with each other and, according to some example embodiments, may maintain a minimum distance from each other and the feeds. Further, according to some example embodiments, the metasurface resonators may be placed where the conditions of all desired beams or patterns are met within a given threshold error. Further, the geometry of metasurface resonators, as subwavelength devices, may be a degree of freedom in the optimization. The metasurface resonator geometry may determine the magnitude and phase of the metasurface resonator at a given frequency of operation. According to some example embodiments, the magnitude and phase can be controlled separately and may be optimized independently. Further, the polarization of the metasurface resonators may also be considered as a degree of freedom. In this regard, the metasurface resonator may respond to different components of an incident vector electromagnetic field and may radiate into different components of the radiated vector electromagnetic field.

Additionally, according to some example embodiments, the metasurface resonator may be tunable as dynamic devices, and the tunability of the metasurface resonators may be a degree of freedom for consideration. In this regard, the metasurface resonators may comprise dynamic components that can be modified with an external stimulus, such as, for example a semiconductor component or a switch.

As indicated above, the maximum error threshold may also be a variable for consideration in the optimization method. In this regard, the metasurface resonators may be placed to satisfy some or all beam or pattern conditions up to a certain error threshold. Beyond the error threshold, no more further metasurface resonators may be added. As such, the error threshold may operate as a cap on the number of metasurface resonator that may be placed. As such, the error threshold may also indirectly have an impact on the placement of the metasurface resonators.

Having described various example embodiments of optimization methods, it is understood that a multifunctional antenna structure may be constructed based on the design provided by the optimization method. As such, according to some example embodiments, a multifunctional antenna structure configured to generate a plurality of radiation patterns is provided. The antenna structure may comprise a waveguide, a plurality of feeds operably coupled to the waveguide, and an antenna aperture surface operably coupled to the waveguide and the plurality of feeds. The antenna aperture surface may comprise a plurality of metasurface resonators positioned on the antenna aperture surface to generate the plurality of radiation patterns. In this regard, the positioning of the plurality of metasurface resonators may be based on an iterative application of a plurality of degrees of freedom for a configuration of the metasurface resonators that exhibit less than a maximum error threshold (e.g., maximum phase error threshold) relative to a desired source field associated with the plurality of radiation patterns. In this regard, according to some example embodiments, the plurality of degrees of freedom may comprise metasurface resonator geometries that exhibit different polarizabilities. Additionally or alternatively, the plurality of metasurface resonators may be spaced in accordance with a resonator proximity constraint such that no metasurface resonator is within a threshold distance of another metasurface resonator to inhibit mutual coupling between to metasurface resonators below a mutual coupling threshold. Additionally or alternatively, according to some example embodiments, the plurality of metasurface resonators may be spaced in accordance with a feed proximity constraint such that no metasurface resonator is within a threshold distance of a feed to inhibit mutual coupling between the metasurface resonators and the feeds below a mutual coupling threshold. Additionally or alternatively, the waveguide may be a parallel plate waveguide. Additionally or alternatively, at least some radiation patterns in of the plurality of radiation patterns may have a different polarization, frequency, or beam angle. Additionally or alternatively, the metasurface resonators are complementary electric inductor-capacitor (cELC) resonators.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for constructing a multifunctional antenna structure configured to generate a plurality of radiation patterns, the method comprising:

determining, by processing circuitry, a desired source field associated with the plurality of radiation patterns;

receiving feed locations for a plurality of feeds of a waveguide to an antenna aperture surface of an antenna, wherein the feed locations are disposed at different spatially-defined positions on the waveguide;

defining a grid on the antenna aperture surface, the grid defining a plurality of candidate resonator locations;

implementing a placement procedure on the plurality of candidate resonator locations comprising:

placing a first metasurface resonator at a first resonator location of the plurality of candidate resonator locations in response to selecting the first metasurface resonator by determining, from amongst a collection of candidate metasurface resonators having differing geometries and associated polarizabilities defined in candidate library, which candidate metasurface resonator placed at the first resonator location exhibits, based on the feed locations and a plurality of degrees of freedom for the first resonator location, a minimum error relative to the desired source field amongst the collection of candidate metasurface resonators and satisfies a maximum error threshold relative to the desired source field; and discarding from consideration any metasurface resonator at a second resonator location from the plurality of candidate resonator locations in response to determining, by the processing circuitry, that no candidate metasurface resonator amongst the collection of candidate metasurface resonators placed at the second resonator location satisfies the maximum error threshold.

2. The method of claim 1, wherein placing the first metasurface resonator further comprises implementing a resonator proximity constraint between previously placed metasurface resonators such that no metasurface resonator is placed within a threshold distance of a previously placed metasurface resonator.

3. The method of claim 1, wherein placing the first metasurface resonator further comprises implementing a feed proximity constraint such that no metasurface resonator is placed within a threshold distance of any of the plurality of feeds.

4. The method of claim 1, wherein the geometries of the candidate metasurface resonators defined in the candidate library are defined with respect to a defined phase interval of the associated polarizability.

5. The method of claim 1, wherein determining the minimum error comprises varying a phase of each of the plurality of feeds.

6. The method claim 1, wherein the waveguide is a parallel plate waveguide.

7. The method of claim 1, wherein at least some of radiation patterns of the plurality of radiation patterns have a different polarization, frequency, or beam angle.

8. The method of claim 1, wherein the first metasurface resonator is a complementary electric inductor-capacitor (cELC) resonator.

9. The method of claim 1, wherein determining the desired source field for the plurality of radiation patterns comprises performing a holographic synthesis of the plurality of radiation patterns.

10. The method of claim 1 further comprising determining, based on the desired source field, a number of feeds of the plurality of feeds and the feed locations of the plurality of feeds.

11. The method of claim 1, wherein the grid is non-uniform.

12. The method of claim 1, wherein the geometries of the candidate metasurface resonators defined in the candidate library exhibit different phases and magnitudes.

13. The method of claim 1, wherein the plurality of degrees of freedom are, at least partially based on, operation of externally controlled dynamic tuning devices.

* * * * *